(12) United States Patent
Regan et al.

(10) Patent No.: US 11,177,877 B2
(45) Date of Patent: Nov. 16, 2021

(54) DATA TRANSFER BETWEEN ELECTRICAL-OPTICAL DEVICES

(71) Applicant: HEWLETT PACKARD ENTERPRISE DEVELOPMENT LP, Houston, TX (US)

(72) Inventors: James D. Regan, Ft. Collins, CO (US); Daniel A. Berkram, Loveland, CO (US); Peter D. Maroni, Windsor, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 10 days.

(21) Appl. No.: 16/424,596

(22) Filed: May 29, 2019

(65) Prior Publication Data

US 2020/0382211 A1    Dec. 3, 2020

(51) Int. Cl.
*H04B 10/079* (2013.01)
*H04B 10/50* (2013.01)
*G01K 1/14* (2021.01)

(52) U.S. Cl.
CPC ......... *H04B 10/07955* (2013.01); *G01K 1/14* (2013.01); *H04B 10/503* (2013.01); *H04B 10/0795* (2013.01)

(58) Field of Classification Search
None
See application file for complete search history.

(56) References Cited

U.S. PATENT DOCUMENTS

| | | | |
|---|---|---|---|
| 6,341,032 B1* | 1/2002 | Fukashiro | H01S 3/0014 359/337 |
| 6,947,623 B2 | 9/2005 | Ramaswami et al. | |
| 8,160,453 B1* | 4/2012 | Harley | H04B 10/032 398/158 |
| 9,225,423 B1* | 12/2015 | Charbonneau-Lefort | H04B 10/2575 |
| 9,444,551 B2* | 9/2016 | Fang | H04B 10/2575 |
| 9,766,409 B2 | 9/2017 | Pelley et al. | |

(Continued)

OTHER PUBLICATIONS

Hertsens, Tyll, An Overview of Laser Diode Characteristics, 2005 (Year: 2005).*

(Continued)

*Primary Examiner* — Jai M Lee
(74) *Attorney, Agent, or Firm* — Hewlett Packard Enterprise Patent Department

(57) ABSTRACT

Systems and methods for performing data transfer between first and second electrical devices are provided. One method may include electrically coupling the first electrical device to a first electrical-optical (E-O) device via a first plurality of electrical lanes, electrically coupling the second electrical device to a second E-O device via a second plurality of electrical lanes, optically coupling the first and second E-O devices via a plurality of optical lanes, and transferring data therebetween via a first optical lane. The method may include monitoring one or more parameters associated with an optical transmitter of the first optical lane, and comparing each parameter to a respective threshold. Responsive to the comparison, the method includes commencing transfer of data between the first and second E-O devices via a second optical lane, and terminating transfer of the data between the first and second E-O devices via the first optical lane.

20 Claims, 6 Drawing Sheets

(56) References Cited

U.S. PATENT DOCUMENTS

| | | | | |
|---|---|---|---|---|
| 10,425,160 B2* | 9/2019 | Leigh | | H04B 10/00 |
| 2003/0072057 A1* | 4/2003 | Frigo | | H04J 14/02 |
| | | | | 398/72 |
| 2005/0123250 A1* | 6/2005 | Gotz | | H04B 10/25 |
| | | | | 385/88 |
| 2006/0018661 A1* | 1/2006 | Green | | H04B 10/1127 |
| | | | | 398/128 |
| 2009/0279889 A1* | 11/2009 | Kirkpatrick | | H04B 10/25752 |
| | | | | 398/41 |
| 2011/0150487 A1* | 6/2011 | Walter | | H04B 10/25759 |
| | | | | 398/115 |
| 2012/0039603 A1* | 2/2012 | Wiegner | | H04L 1/203 |
| | | | | 398/43 |
| 2012/0328304 A1* | 12/2012 | Ikushima | | H04B 10/2589 |
| | | | | 398/140 |
| 2013/0236188 A1* | 9/2013 | Hung | | H04B 10/25 |
| | | | | 398/116 |
| 2014/0003283 A1* | 1/2014 | Koenen | | H04L 47/41 |
| | | | | 370/254 |
| 2014/0029935 A1* | 1/2014 | Regan | | H04L 7/10 |
| | | | | 398/25 |
| 2014/0270800 A1* | 9/2014 | Masarik | | H05K 7/02 |
| | | | | 398/131 |
| 2015/0010311 A1* | 1/2015 | Parekh | | G02B 6/4293 |
| | | | | 398/116 |
| 2015/0074466 A1 | 3/2015 | Adar et al. | | |
| 2015/0215032 A1* | 7/2015 | Bevilacqua | | H04J 14/0267 |
| | | | | 398/5 |
| 2016/0366497 A1* | 12/2016 | Tandi | | H04Q 11/0005 |
| 2017/0019166 A1* | 1/2017 | Yadlowsky | | H04B 10/40 |

OTHER PUBLICATIONS

Phillips, A. et al.; "Redundancy Strategies for a High Splitting Optically Amplified Passive Optical Network"; Feb. 2001; 13 pages.

RAD Data Commmunications; "Optimux-134"; printed on Oct. 2, 2018 from: https://radproductsonline.com/documents/manuals/Optimux-134.pdf; 132 pages.

* cited by examiner

DATA TRANSFER BETWEEN ELECTRICAL-OPTICAL DEVICES

BACKGROUND

Optical communication systems may be utilized for the transfer of video or other high-bandwidth data between electrical devices in computing systems. Generally, optical communication systems may include one or more optical transmitters and one or more optical receivers, each optical transmitter communicatively coupled to a respective optical receiver via an optical medium, such as optical fiber. Each optical transmitter may convert an electrical signal generated by one electrical device of a computing system into an optical signal to transmit through the optical fiber. The optical signal may travel through the optical fiber and may be received by the respective optical receiver, where the signal is converted to an electrical signal and transmitted to another electrical device of the computing system.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
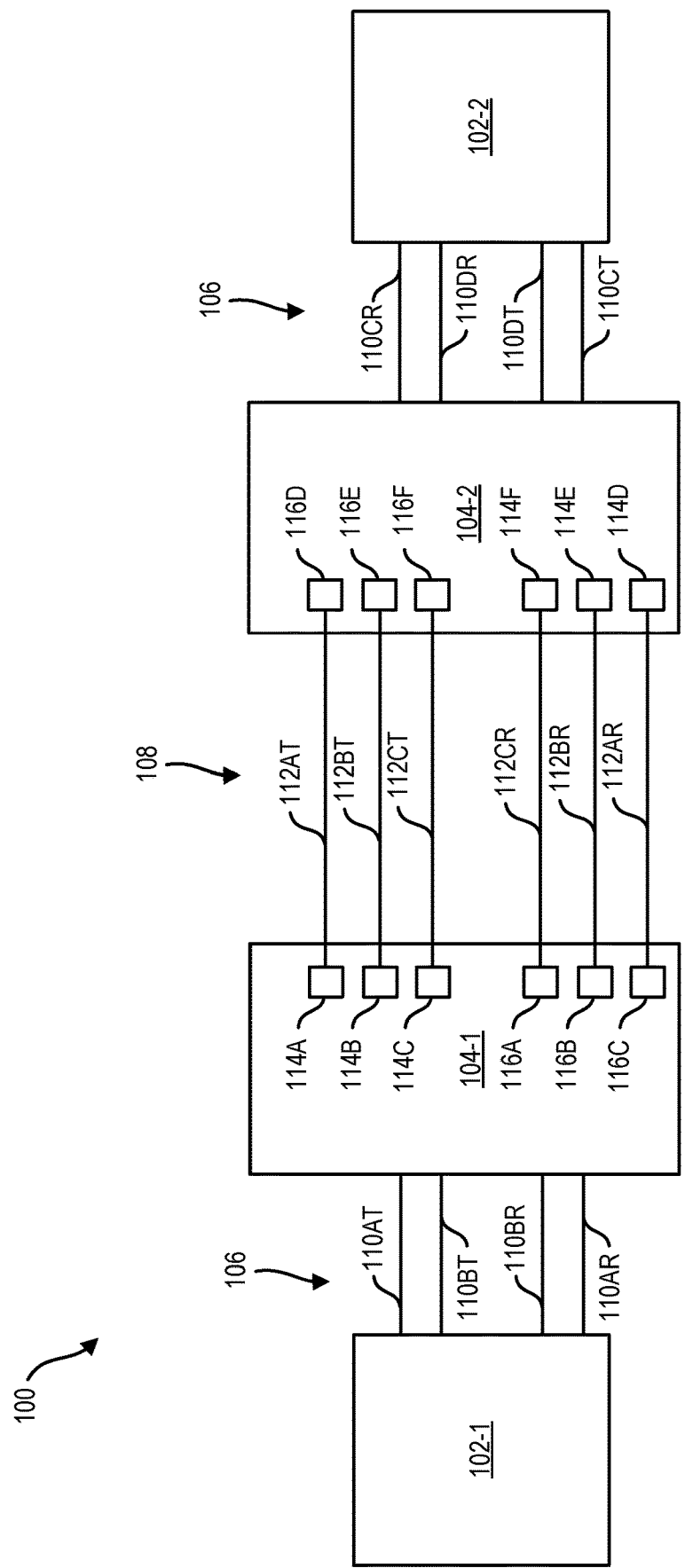
FIG. 1 is a schematic of a data communication system, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the articles "a" and "an" are intended to have their ordinary meaning in the patent arts, namely "one or more." Herein, the term "about" when applied to a value generally means within the tolerance range of the equipment used to produce the value, or in some examples, means plus or minus 10% unless otherwise expressly specified. Moreover, examples herein are intended to be illustrative only and are presented for discussion purposes and not by way of limitation.

Optical communication systems may be utilized for the transfer of video or other high-bandwidth data between electrical devices (e.g., computing devices) in a computing system. An example optical communication system may include a plurality of optical transmitters and a plurality of optical receivers, each optical transmitter communicatively coupled to a respective optical receiver via an optical medium, such as an optical fiber. Each optical transmitter may be capable of converting an electrical signal generated by one electrical device of a computing system into an optical signal to transmit through the optical fiber. The optical signal may traverse the optical fiber and may be received by the respective optical receiver, where the signal may be converted to an electrical signal and transmitted to another electrical device of the computing system.

Optical communication systems, such as the example optical communication system disclosed above, may include a plurality of optical fibers that may further form a plurality of optical lanes. Each optical lane may include a transmission pathway and a reception pathway, and each transmission pathway and each reception pathway may include an optical transmitter and an optical receiver communicatively coupled with one another via an optical fiber. One or more optical lanes may form an optical link.

Generally, each optical lane may be mapped to a respective electrical lane connecting the optical transmitter to the electrical device providing the generated electrical signal. However, due in part to reliability issues of some optical transmitters (e.g., vertical cavity surface emitting lasers (VCSELs) and silicon photonic transmitter devices), which often results in the corruption of one or more optical lanes, some optical communication systems may include one or more secondary or redundant optical lanes. Such redundant optical lanes may be inactive while no errors are detected in the data transmitted in each active optical lane. In the event an error is detected, one or more of the redundant optical lanes may be activated to permit for the transfer of data traffic flow from a corrupt optical lane (i.e., a lane in which an error is detected) to a redundant optical lane.

Although the use of redundant optical lanes in the event of the corruption of an optical lane has been useful to optimize data transfer between electrical devices of a computing system, such a mechanism recovers from errors rather than preventing errors from occurring by addressing the underlying reliability issues related to the optical transmitters. Although reliability continues to improve, optical transmitters may be subject to impaired performance, and in some cases, failure as a result of operating at temperatures above a determined temperature threshold. In addition, the run time of optical transmitters in optical communication systems are often not tracked, thus often resulting in the unplanned failure of an optical transmitter at the end of its operational lifespan. As each optical transmitter may have a different run time from the other optical transmitters in the optical communication system, the optical transmitters may not wear evenly, thus resulting in unpredictable failures.

Accordingly, examples of the present disclosure are directed to systems and methods for improving the resiliency of the optical links in an optical communication system via the monitoring of one or more parameters associated with each optical transmitter in the optical links and transferring data flow traffic from one optical lane to another optical lane when a parameter of the one or more parameters exceeds or falls below a respective threshold. To that end, data transfer systems of the present disclosure include a plurality of optical lanes including one or more redundant lanes.

The one or more parameters may include, for example, at least one of a run time, a temperature of the optical transmitter, a transmitter output power, a receiver input power, and a link margin measured at the receiver. In examples in which the one or more parameters include the temperature of the optical transmitter, the data flow traffic may be transferred from one optical lane to another optical lane when the temperature of the optical transmitter exceeds a determined temperature threshold, thereby allowing the optical transmitter to cool and preventing the optical transmitter from failing as a result of excessive heating. By doing so, the optical lane including the optical transmitter may be placed on standby to be reactivated for future use after sufficient cooling. In examples in which the one or more parameters include the run time of the optical transmitter, the data flow traffic may be transferred from one optical lane to another optical lane when the run time of the optical transmitter exceeds a determined run time threshold, thereby allowing the optical transmitter to be temporarily taken out of service before failing from excessive wear. By doing so, the optical lane including the optical transmitter may be placed on standby to be reactivated for future use when other optical transmitters have equal wear. Thus, the optical transmitters may wear evenly, thereby resulting in fewer unplanned failures. In examples where the parameter is receiver input power or link margin measured at the receiver, the measurements would be made at the remote receiver and communicated via in-band messaging across the link, or through out-of-band messaging through another interface, such as a management interface like I2C.

More particularly, in one example of the present disclosure, a method is provided for performing data transfer between a first electrical device and a second electrical device. The method may include electrically coupling the first electrical device to a first electrical-optical (E-O) device via a first plurality of electrical lanes. The method may also include electrically coupling the second electrical device to a second E-O device via a second plurality of electrical lanes. The method may further include optically coupling the first E-O device and the second E-O device via a plurality of optical lanes. The plurality of optical lanes may be greater in number than each of the first plurality of electrical lanes and the second plurality of electrical lanes. Each optical lane may have a transmission pathway and a reception pathway, and each transmission pathway and each reception pathway may have an optical transmitter and an optical receiver. The method may also include transferring data between the first E-O device and the second E-O device via a first optical lane of the plurality of optical lanes. The method may further include monitoring one or more parameters associated with an optical transmitter of the first optical lane, the one or more parameters including at least one of run time and temperature of the optical transmitter. The method may also include comparing each parameter of the one or more parameters to a respective threshold. The method may further include, in response to the comparison of the one parameter of the one or more parameters to the respective threshold, commencing transfer of data between first E-O device and the second E-O device via a second optical lane of the plurality of optical lanes, and terminating transfer of the data between the first E-O device and the second E-O device via the first optical lane.

In another example of the present disclosure, a data communication system is provided. The data communication system may include a first electrical device, a second electrical device, a first electrical-optical (E-O) device, a second E-O device, and a processing resource. The first E-O device may be coupled to the first electrical device via a first plurality of electrical lanes. The second E-O device may be coupled to the second electrical device via a second plurality of electrical lanes. The second E-O device may be further coupled to the first E-O device via a plurality of optical lanes. The plurality of optical lanes may be greater in number than each of the first plurality of electrical lanes and the second plurality of electrical lanes. Each optical lane may have a transmission pathway and a reception pathway, and each transmission pathway and each reception pathway may have an optical transmitter and an optical receiver. The processing resource may: transfer data between the first E-O device and the second E-O device via a first optical lane of the plurality of optical lanes; monitor one or more parameters associated with an optical transmitter of the first optical lane, the one or more parameters including at least one of run time and temperature of the optical transmitter; compare each parameter of the one or more parameters to a respective threshold; and in response to the comparison of at least one parameter of the one or more parameters to the respective threshold, commence transfer of data between first E-O device and the second E-O device via a second optical lane of the plurality of optical lanes, and terminate transfer of the data between the first E-O device and the second E-O device via the first optical lane.

In another example of the present disclosure, a processing resource, the processing resource programmed to perform the logic of: transferring data between a first E-O device and a second E-O device via a first optical lane of a plurality of optical lanes coupling the first E-O device and the second E-O device, wherein the first electrical-optical (E-O) interface device is coupled to a first electrical device via a first plurality of electrical lanes, the second E-O device is coupled to a second electrical device via a second plurality of electrical lanes, the plurality of optical lanes is greater in number than each of the first plurality of electrical lanes and the second plurality of electrical lanes, each optical lane has a transmission pathway and a reception pathway, and each transmission pathway and each reception pathway has an optical transmitter and an optical receiver; monitoring one or more parameters associated with an optical transmitter of the first optical lane, the one or more parameters including at least one of run time and temperature of the optical transmitter; comparing each parameter of the one or more parameters to a respective threshold; and in response to the comparison of the at least one parameter of the one or more parameters to the respective threshold, commencing transfer of data between first E-O device and the second E-O device via a second optical lane of the plurality of optical lanes, and terminating transfer of the data between the first E-O device and the second E-O device via the first optical lane.

Turning now to the drawings, FIG. 1 is a schematic of a data communication system 100, according to one or more examples of the disclosure. The data communication system 100 may be a computing system or, in other examples, the data communication system 100 may be part of a computing system. The data communication system 100 may include a plurality of electrical devices 102-1 and 102-2 (also referred to collectively as electrical devices 102 or individually and generally as an electrical device 102) communicatively coupled with one another to transfer data therebetween. Each electrical device 102 may be, for example, a computing device, such as a server, and may be configured to generate and receive electrical signals representing data.

The data communication system 100 may also include a plurality of electrical-optical (E-O) devices 104-1 and 104-2 (also referred to collectively as E-O devices 104 or individually and generally as an E-O device 104). In one or more implementations, the E-O devices 104 may each be repeaters. Each E-O device 104 is electrically connected to a respective electrical device 102 and configured to convert received optical signals to electrical signals and received electrical signals to optical signals. To that end, each E-O device 104 is electrically coupled to a respective electrical device 102 via one or more electrical links 106 and optically connected to another E-O device 104 via one or more optical links 108.

Each electrical link 106 may include one or more electrical lanes to transmit the electrical signals representing data between the electrical device 102 and the E-O device 104. Accordingly, each electrical lane may include a transmission pathway and a reception pathway. As provided in FIG. 1, the electrical link 106 coupling the electrical device 102-1 to the E-O device 104-1 may include a plurality of electrical lanes 110AT, 110AR and 110BT, 110BR (also referred to collectively as electrical lanes 110 or individually and generally as an electrical lane 110). Electrical lane 110AT, 110AR includes a transmission pathway 110AT and a reception pathway 110AR. Electrical lane 110BT, 110BR includes a transmission pathway 110BT and a reception pathway 110BR. Likewise, the electrical link 106 coupling the electrical device 102-2 to the E-O device 104-2 may include a plurality of electrical lanes 110CT, 110CR and 110DT, 110DR (also referred to collectively as electrical lanes 110 or individually and generally as an electrical lane 110). Electrical lane 110CT, 110CR includes a transmission pathway 110CT and a reception pathway 110CR. Electrical lane 110DT, 110DR includes a transmission pathway 110DT and a reception pathway 110DR.

Each optical link 106 may include one or more optical lanes to transmit the optical signals representing data between the E-O devices 104. Accordingly, each optical lane may include a transmission pathway and a reception pathway. As provided in FIG. 1, the optical link 106 coupling the E-O devices 104 may include a plurality of optical lanes 112AT, 112AR; 112BT, 112BR; and 112CT, 112CR (also referred to collectively as optical lanes 112 or individually and generally as an optical lane 112). Optical lane 112AT, 112AR includes a transmission pathway 112AT and a reception pathway 112AR. Optical lane 112BT, 112BR includes a transmission pathway 112BT and a reception pathway 112BR. Optical lane 112CT, 112CR includes a transmission pathway 112CT and a reception pathway 112CR.

Although the data communication system 100 of FIG. 1 illustrates two electrical lanes 110 connecting each E-O device 104 to a respective electrical device 102 and three optical lanes 112 coupling the E-O devices 104, the present disclosure is not limited thereto. For purposes of this disclosure, data communication systems disclosed herein may include any number of optical lanes 112 and any number of electrical lanes 110, where the number of optical lanes 112 optically coupling the E-O devices 104 is greater than the number of electrical lanes 110 electrically coupling an E-O device 104 to a respective electrical device 102. For example, a data communication system 100 may include N optical lanes 112 coupling E-O devices 104, and M electrical lanes 102 coupling each E-O device 104 to a respective electrical device 102, where N>M. In the example illustrated in FIG. 1, the ratio of optical lanes 112 to electrical lanes 110 is 3:2. In another example, the data communication system 100 may include 24 optical lanes 112 coupling the E-O devices 104 and 16 electrical lanes 110 coupling each E-O device 104 to a respective electrical device 102.

As illustrated in FIG. 1, each transmission pathway 112AT-112CT and each reception pathway 112AR-112CR of the optical lanes 112 includes an optical transmitter and an optical receiver. Accordingly, as shown in FIG. 1, the E-O device 104-1 includes a plurality of optical transmitters 114A-114C, and the E-O device 104-2 includes a plurality of optical transmitters 114D-114F. In the present disclosure, the optical transmitters 114A-114F may also be referred to collectively as optical transmitters 114 or individually and generally as an optical transmitter 114. The E-O device 104-1 includes a plurality of optical receivers 116A-116C, and the E-O device 104-2 includes a plurality of optical receivers 116D-116F. In the present disclosure, the optical receivers 116A-116F may also referred to collectively as optical receivers 116 or individually and generally as an optical receiver 116. As shown in FIG. 1, the optical transmitters 114 and the optical receivers 116 may be grouped separately in each E-O device 104. In other examples, the optical transmitters 114 may be alternating or interleaved with the optical receivers 116.

As arranged, each E-O device 104 as shown in FIG. 1 includes optical transmitters 114 and optical receivers 116 and thus may both function as a transmitter and a receiver. It will be appreciated that each E-O device 104 may differ. For example, one E-O device 104 may have more or all of the optical transmitters 116. Advantages to each E-O device 104 being identical may be based on many data protocols being symmetric and such a configuration may use the same control logic (logicware, software, firmware, etc.) on each E-O device 104.

Each transmission pathway 112AT-112CT and each reception pathway 112AR-112CR of the optical lanes 112 may be formed from one or more optical fibers (not separately shown). Each transmission pathway 110AT-110DT and each reception pathway 110AR-110DR of each electrical lane 110 may be formed from an electrical conductor, such as an electrical transmission line, an electrical wire, a metal wire film commonly used in printed circuit boards (PCBs), or a combination thereof. As will be more evident in the discussion of FIG. 2, each transmission pathway 110AT-110BT of an electrical lane 110 is to be communicatively coupled with a respective transmission pathway 112AT-112CT of an optical lane 112 in an E-O device 104. Correspondingly, each reception pathway 110AR-110DR of an electrical lane 110 is to be communicatively coupled with a respective reception pathway 112AR-112CR of an optical lane 112 in an E-O device 104. As the data communication systems of the present disclosure include at least one additional, or redundant, optical lane 112, at least one optical lane 112 will not be communicatively coupled to a respective electrical lane 110 during operation of the data communication system 100.

Each optical transmitter 114 may be configured to receive an electrical signal from the electrical device 102, convert the electrical signal to an optical signal, and emit the optical signal representing data to an optical fiber coupled thereto. Accordingly, each optical transmitter 114 may be a light source, and in one or more examples, each optical transmitter 114 may be a vertical cavity surface emitting laser (VCSEL). In other examples, each optical transmitter 114 may be a silicon photonic transmitter device, such as, for example, a ring resonator. Each optical receiver 116 may be configured to receive an optical signal from a respective optical transmitter 114 via an optical fiber, convert the optical signal to an electrical signal, and transmit the electrical signal representing data to the electrical device 102. Each optical receiver 116 may be a photodetector, and in one or more examples, each optical receiver 116 may be a photodiode. In other examples, each optical receiver 116 may be a silicon photonic receiver. Both the optical transmitters 114 and the optical receivers 116 may be configured as arrays or single elements.

Figure 2:
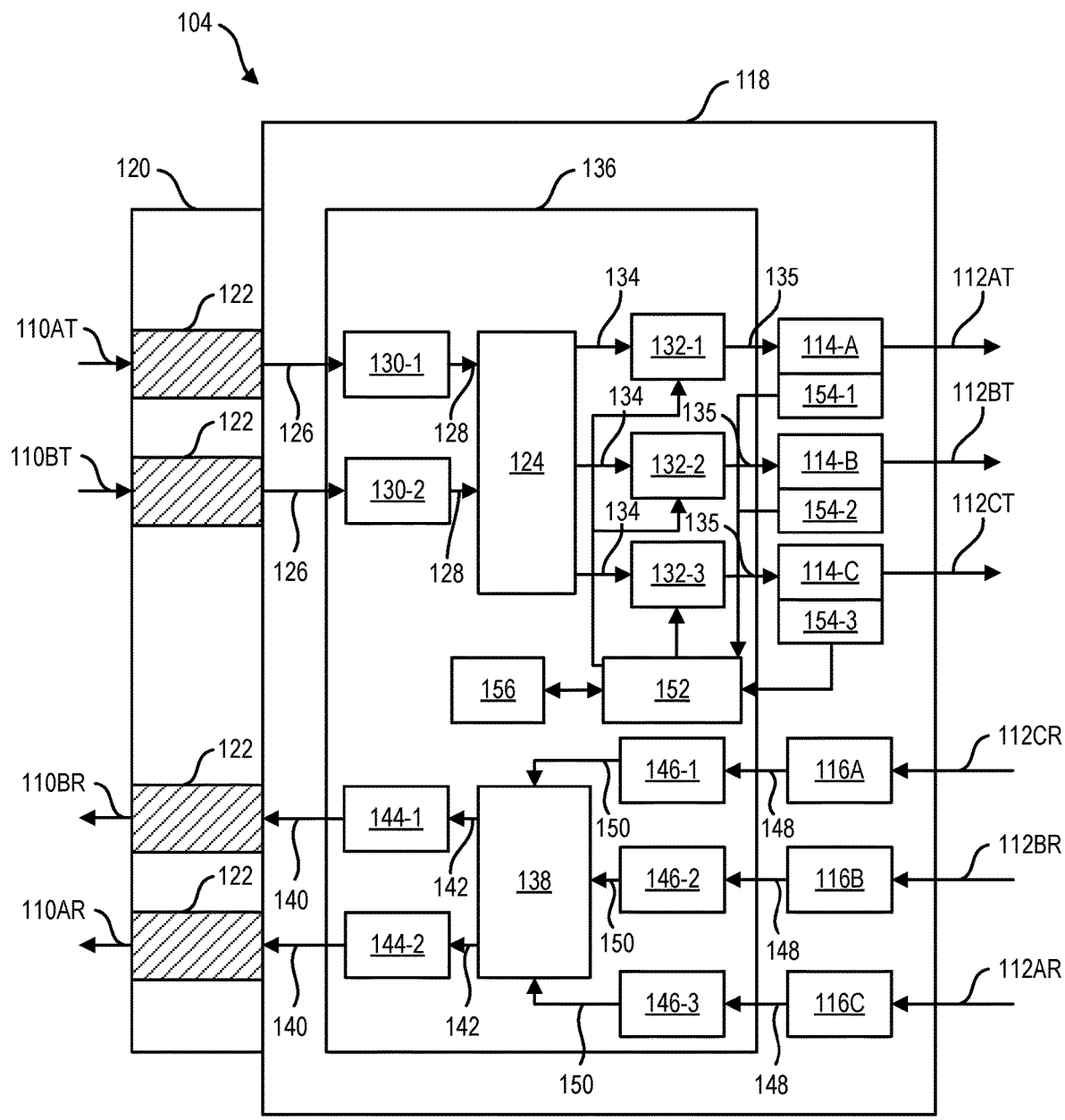
FIG. 2 is a schematic of an electrical-optical device of the data communication system of FIG. 1, according to one or more examples of the disclosure.

Referring now to FIG. 2 with continued reference to FIG. 1, FIG. 2 is a more detailed schematic of an E-O device 104 of the data communication system 100 of FIG. 1, according to one or more examples of the disclosure. The E-O device 104 illustrated in FIG. 2 may be representative of either E-O device 104-1 or 104-2 shown in FIG. 1 but will be referenced with elements of E-O device 104-1 only for illustrative purposes. The E-O device 104 may include a substrate 118, such as, for example, a PCB. At one end of the substrate 118, the E-O device 104 may include an electrical connector 120 to connect the E-O device 104 to the electrical device 102 (FIG. 1). The electrical connector 120 may have a plurality of electrical contacts 122 (four shown).

The E-O device 104 may further include a transmission pathway switch 124 electrically coupled to the electrical connector 120 and the electrical device 102 via electrical lines 126, 128 and electrical receiver PHYs 130-1 and 130-2 (also referred to collectively as electrical receiver PHYs 130 or individually and generally as an electrical receiver PHY 130). The transmission pathway switch 124 may further be coupled to each of the optical transmitters 114 via a plurality of optical transmitter PHYs 132-1 through 132-3 (also referred to collectively as optical transmitter PHYs 132 or individually and generally as an optical transmitter PHY 132) and electrical lines 134, 135. Each of electrical lines 126, 128, 134, 135 may represent a portion of a transmission pathway 110AT-110BT of an electrical lane 110. In one or more examples, each optical transmitter PHY 132 may function as source driver. In other examples, the optical transmitter PHYs 132 may be packaged with the transmission pathway switch 124 as part of a switch unit. As illustrated in FIG. 1, each of the transmission pathway switch 124, the electrical receiver PHYs 130, and the optical transmitter PHYs 132 may be part of an application specific integrated circuit (ASIC) 136. In other examples, each of the transmission pathway switch 124, the electrical receiver PHYs 130, and the optical transmitter PHYs 132 may be separate and distinct ASICs.

The E-O device 104 may also include a reception pathway controller 138 electrically coupled to the electrical connector 120 via electrical lines 140, 142 and electrical transmitter PHYs 144-1 and 144-2 (also referred to collectively as electrical transmitter PHYs 144 or individually and generally as an electrical transmitter PHY 144). The reception pathway controller 138 may further be coupled to each of the optical receivers 116 via a plurality of optical receiver PHYs 146-1 through 146-3 (also referred to collectively as optical receiver PHYs 146 or individually and generally as an optical receiver PHY 146) and electrical lines 148, 150. Each of electrical lines 140, 142, 148, 150 may represent a portion of a reception pathway 110AR-110BR of an electrical lane 110. The reception pathway controller 138 may be configured to receive and route the reception pathway electrical signals onto electrical lines 140, 142 leading from the reception pathway controller 138 to the electrical connector 120 and the respective electrical lanes 110. As illustrated in FIG. 1, each of the reception pathway controller 138, the electrical transmitter PHYs 144, and the optical receiver PHYs 146 may be part of the ASIC 136. In other examples, each of the reception pathway controller 138, the electrical transmitter PHYs 144, and the optical receiver PHYs 146 may be separate and distinct ASICs.

The E-O device 104 may also include a link controller 152. The transmission pathway switch 124 may be communicatively coupled to the link controller 152 and may receive instructions from the link controller 152 to communicate with and configure the transmission pathway switch 124, as will be described in more detail relative to FIGS. 3 and 4 below. The link controller 152 may further be communicatively coupled to each of the optical transmitter PHYs 132 to selectively drive the optical transmitters 114.

In addition to the transmission pathway switch 124 and the optical transmitter PHYs 132, the link controller 152 may be communicatively coupled to one or more sensors 154-1 through 154-3 (also referred to collectively as sensors 154 or individually and generally as a sensor 154) included in the E-O device 104. In one or more examples, the link controller 152 may be coupled to a plurality of sensors 154, each sensor 154 being in thermal communication with a respective optical transmitter 114 of the E-O device 104. In some examples, each sensor 154 may be integrated with or coupled to a respective optical transmitter 114 as shown in FIG. 2.

Each sensor 154 may be configured to detect a parameter associated with the respective optical transmitter 116. For example, each sensor 154 may be configured to detect the temperature of a respective optical transmitter 114. Accordingly, the link controller 152 may monitor the temperature of each optical transmitter 114 via the respective sensor 154 in thermal communication with the optical transmitter 114. In one or more examples, the link controller 152 may monitor the temperature of each optical transmitter 114 continuously. In other examples, the link controller 152 may monitor the temperature of each optical transmitter 114 periodically. In yet other examples, the link controller 152 may monitor the temperature of each optical transmitter 114 aperiodically.

The E-O device 104 may also include another sensor, such as a counter 156, communicatively coupled to the link controller 152. In some implementations, the counter 156 may be part of the link controller 152. The counter 156 may be configured to track the run time of each optical transmitter 114 to allow the link controller 152 to monitor the amount of wear of each optical transmitter 114. As shown in FIG. 2, the counter 156 is part of the ASIC 136; however, in other implementations, the counter 156 may be a separate ASIC or part of the ASIC including the link controller 152.

As discussed above with respect to FIG. 1, the E-O device 104 includes a plurality of optical transmitters 114A-114C and a plurality of optical receivers 116A-116C disposed in an array at an opposing end of the substrate 118 from the electrical connector 120. The optical transmitters 114A-114C and optical receivers 116A-116C may be coupled to the optical fibers (not separately shown) of the optical lanes 112 via a single direct coupling, or in other examples, by multiple direct coupling, where each optical fiber is separately coupled to the respective optical transmitter 114 or optical receiver 116. As illustrated in FIG. 2, the optical transmitters 114 and optical receivers 116 are separately grouped. In other examples, the optical transmitters 114 and optical receivers 116 may be interleaved to form a transducer array and to be arranged such that each adjacent pair of optical transmitters 114 and optical receivers 116 is part of a respective optical lane 112. As shown in FIG. 2, the E-O interface 104 is coupled to three optical lanes 112 and two electrical lanes 110.

Figure 3:
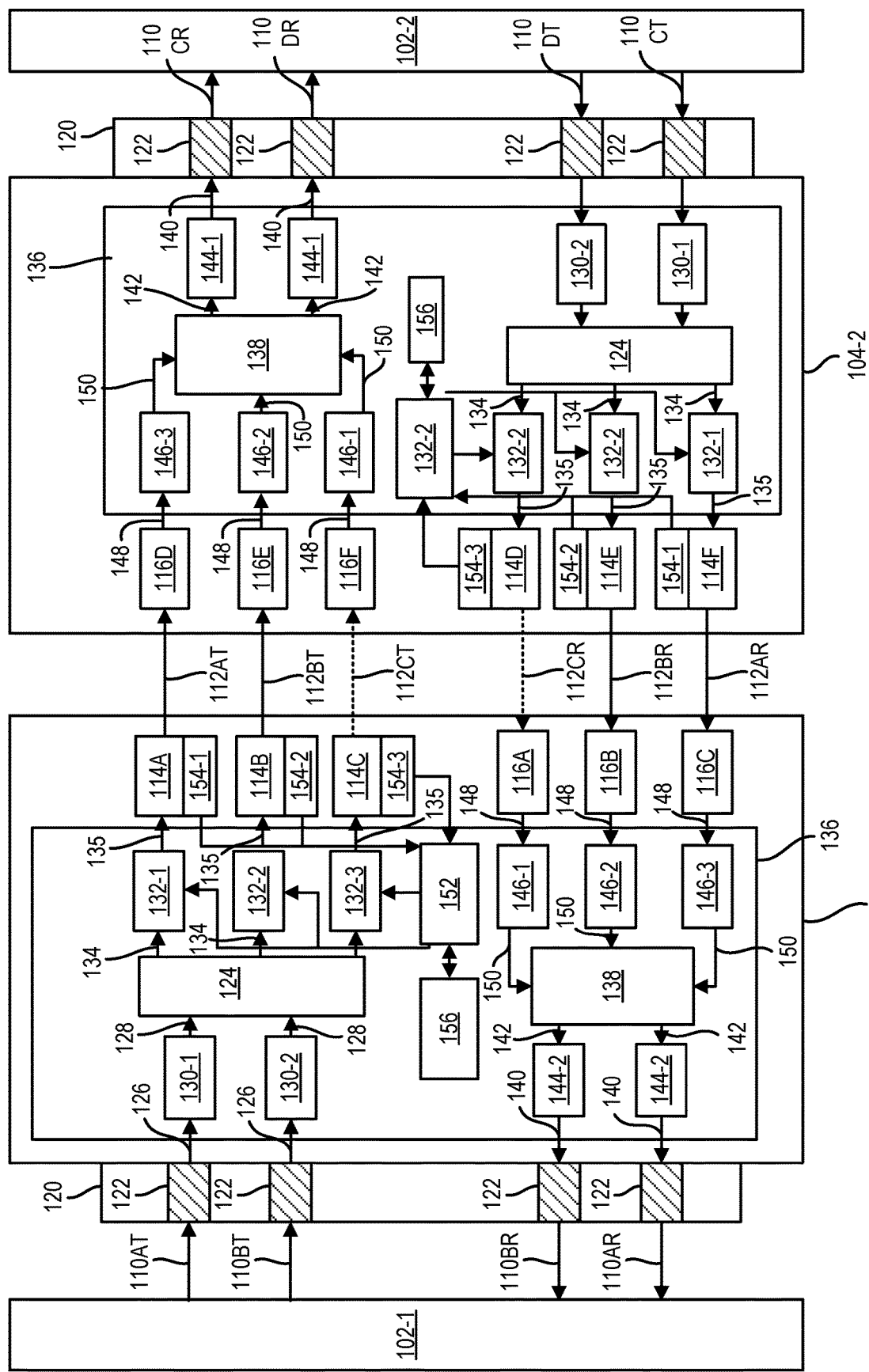
FIG. 3 is a more detailed schematic of the data communication system of FIG. 1 at a first operational state, according to one or more examples of the disclosure.
Figure 4:
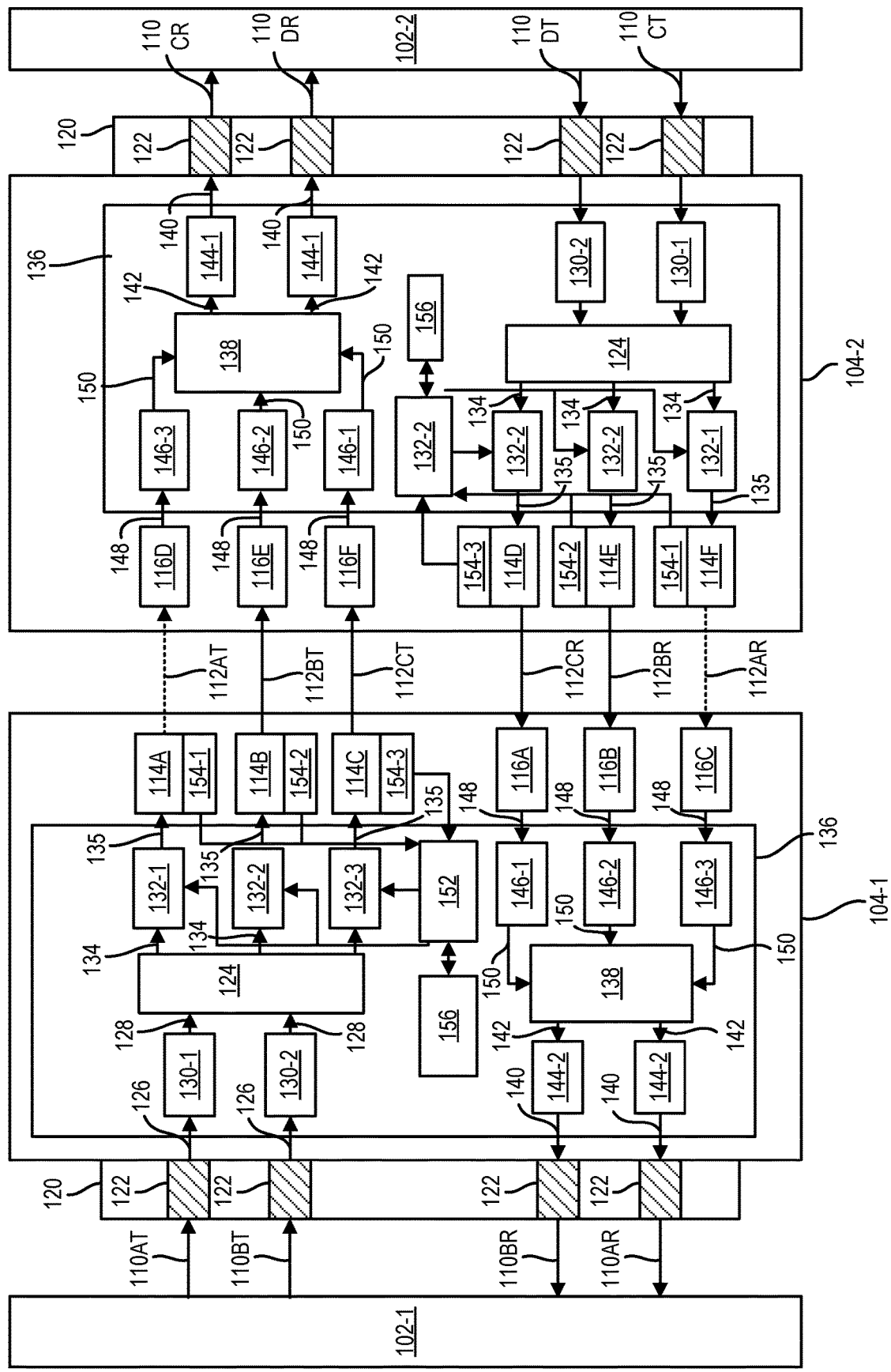
FIG. 4 is a more detailed schematic of the data communication system of FIG. 1 at a second operational state, according to one or more examples of the disclosure.

The operation of the data communication system 100 of FIG. 1 may now be discussed with reference to FIGS. 3 and 4 of the present disclosure. FIGS. 3 and 4 illustrate more detailed schematics of the data communication system 100 of FIG. 1 at different operational states, according to one or more examples of the disclosure. The data communication system 100 includes electrical devices 102-1 and 102-2 communicatively connected with one another via respective E-O devices 104-1 and 104-2. Each E-O device 104 may be configured as illustrated in FIG. 2 of the present disclosure.

Beginning with FIG. 3, electrical device 102-1 may generate one or more electrical signals representative of data to be transmitted to electrical device 102-2. Although for purposes of this discussion of operation, electrical device 102-1 generates the electrical signals and electrical device 102-2 receives the electrical signals, it will be appreciated that the electrical device 102-2 may generate and transmit one or more electrical signals and electrical device 102-1 may receive the electrical signals from electrical device 102-2 in some implementations. In still yet other implementations, each of electrical devices 102-1 and 102-2 may generate and receive electrical signals.

In the example of FIG. 3, electrical signals are generated by the electrical device 102-1 and transmitted via respective electrical lanes 110 to respective electrical receiver PHYs 130-1 and 130-2 of the E-O device 104-1 electrically coupled to the electrical device 102-1 via electrical connector 120. More specifically, each electrical signal generated by the electrical device 102-1 may be transmitted via respective electrical lines 126 (portions of transmission pathways 100AT and 100BT of the of the electrical lanes 110). At each electrical receiver PHY 130, the respective electrical signals undergo signal processing (e.g., clock data recovery, electrical receiver equalization, etc.) to provide a clean digital signal before being transmitted to the transmission pathway switch 124 via respective electrical lines 128 (portions of transmission pathways 100AT and 100BT of the of the electrical lanes 110). As will be appreciated, the number of electrical lines 128 connected to the transmission pathway switch 124 may correspond to the number of electrical lanes 110 coupling each E-O device 104 to a respective electrical device 102.

The transmission pathway switch 124 may be coupled to a plurality of electrical lines 134. The number of electrical lines 134 of the transmission pathway switch 124 may correspond to the number of optical lanes 112 coupling each E-O device 104 to the other. Accordingly, as shown in FIGS. 3 and 4, the transmission pathway switch 124 includes three electrical lines 134 corresponding to the three optical lanes 112 coupling the E-O devices 104. The transmission pathway switch 124 may be further communicatively coupled to the link controller 152, such that the link controller 152 may configure the transmission pathway switch 124 to output the electrical signals via selected electrical lines 134. Accordingly, the link controller 152 may configure the transmission pathway switch 124 to map the electrical lanes 110 to the selected optical lanes 112 of the data communication system as provided below.

As shown in FIG. 3, the transmission pathway switch 124 is configured to output the electrical signals via electrical lines 134 to respective optical transmitter PHYs 132-1 and 132-2. Each of optical transmitter PHYs 132-1 and 132-2 receives the respective digital signal from the respective electrical line 134 and drives a low current (digital signal is 0) or a high current (digital signal is 1) to the respective optical transmitter 114A and 114B. Each optical transmitter 114A and 114B converts the digital signal to an optical signal and transmits the optical signal through the transmission pathway 112AT and 112BT of the respective optical lane 112.

The optical signals may be received by the respective optical receivers 116D and 116E of the E-O device 104-2 and converted to digital signals having an electrical current. The digital signals may be transmitted to respective optical receiver PHYs 146-2 and 146-3 of E-O device 104-2 in which a voltage is generated from the electrical current. The electrical signals each having a voltage is transmitted to the receiver pathway controller 138 of the E-O device 104-2 via respective lines 150. The number of electrical lines 150 of the receiver pathway controller 138 may correspond to the number of optical lanes 112 coupling each E-O device 104 to the other. Accordingly, as shown in FIGS. 3 and 4, the receiver pathway controller 138 of each of E-O device 104-1 and 104-2 includes three electrical lines 150 corresponding to the three optical lanes 112 coupling the E-O devices 104. The receiver pathway controller 138 may be configured to output the electrical signals via electrical lines 142. Accordingly, the receiver pathway controller 138 of E-O device 104-2 may be configured to map the selected optical lanes 112 to the electrical lanes 110 of the data communication system 100 as provided below.

The digital signals may be transmitted to respective electrical transmitter PHYs 144-1 and 144-2 via the respective electrical lines 142 to create electrical serial data from the digital signals to transmit to the electrical device 102-2. The foregoing operation of data transfer may be carried out in a similar manner for electrical signals generated by the electrical device 102-2 to be transmitted to the electrical device 102-1 via E-O devices 104.

As provided in FIG. 3, optical lane 112CT, 112CR is configured as the redundant optical lane 112 (indicated by the dashed line) and not in use in the operational state of FIG. 3. During the operational state of FIG. 3, each of the sensors 154 continuously, periodically, or aperiodically detects the temperature of a respective optical transmitter 114 and the counter 156 determines the run time of each optical transmitter 114 of the E-O device 104-1. Accordingly, the link controller 152 monitors the temperature and run time of each optical transmitter 114. The link controller 152 further compares each temperature and run time to a respective determined threshold.

Turning now to FIG. 4, a second operational state of the data communication system 100 is detailed. More specifically, as will be detailed in the discussion of FIG. 4, the link controller 152 monitoring the run time and temperature of each of the optical transmitters 114 has determined that a detected temperature of optical transmitter 114A via sensor 154-1 has exceeded a determined threshold temperature. In another implementation, the link controller 152 may determine that the optical transmitter 114A has exceeded a determined threshold run time via counter 156.

The determined threshold temperature may be a temperature at which a power output of an optical transmitter 114 is reduced. In other examples, the determined threshold run time may be a calculated run time with reference to the run time of the other optical transmitters 114. For example, the determined threshold run time may be calculated to be a run time of 50 percent more than the run time of the other optical transmitters 114. The run time for each optical transmitter 114 may be summed and stored in the link controller 152.

Once the predetermined threshold temperature (or predetermined run time threshold) is exceeded for optical transmitter 114A, the link controller 152 may send a signal to optical transmitter PHY 132-3 to power on the optical transmitter 114C of the transmission pathway 112CT of the redundant optical lane 112CT, 112CR. The optical transmitter PHY 132-3 further initiates link training in which training patterns are transmitted via optical transmitter 114C and transmission pathway 112CT to optical receiver 116F of the E-O device 104-2. The optical receiver 116F and optical receiver PHY 146-1 of E-O device 104-2 may detect that the optical transmitter 114C is enabled and may establish a link between the optical transmitter 114C and the optical receiver 116F.

After the link is established between the optical transmitter 1140 and the optical receiver 116F of the redundant optical lane 112CT, 112CR, the optical transmitter PHY 132-3 sends a signal to the link controller 152 indicating that the optical transmitter 114A may be disabled. The link controller 152 enables the optical transmitter PHY 132-3 to begin driving the optical transmitter 114C to send data that was previously being routed through optical transmitter 114A.

As will be appreciated by those of skill in the art having the benefit of this disclosure, the link controller 152 of E-O device 104-1 and the reception pathway controller 138 of E-O device 104-2 may function as a master and slave, respectively, during switching of the optical lanes 112. The receiver pathway controller 138 of the E-O device 104-2 enables data transmission from the optical receiver 116F to electrical transmitter PHY 144-1 of E-O device 104-2, which is then communicated to electrical device 102-2.

The reception pathway controller 138 of the E-O device 104-2 then disables the optical receiver 116D and the optical receiver PHY 146-3 as each of these is no longer in use. The link controller 152 may then disable optical transmitter 114A and place the optical transmitter 114A in standby mode to cool (in the event the determined threshold temperature was exceeded) or until the wear of at least one other optical transmitter 114 exceeds the wear of the optical transmitter 114A. As such, the optical lane 112AT, 112AR may be the redundant optical lane (indicated by dashed line) as shown in FIG. 4. The link controller 152 may continue to monitor the temperature and run time of each optical transmitter 114 and may enable/disable optical transmitters 114 based on temperature and run time thereof such that any of optical lanes 112 may be a redundant lane at some point during operation of the data communication system 100.

Figure 5:
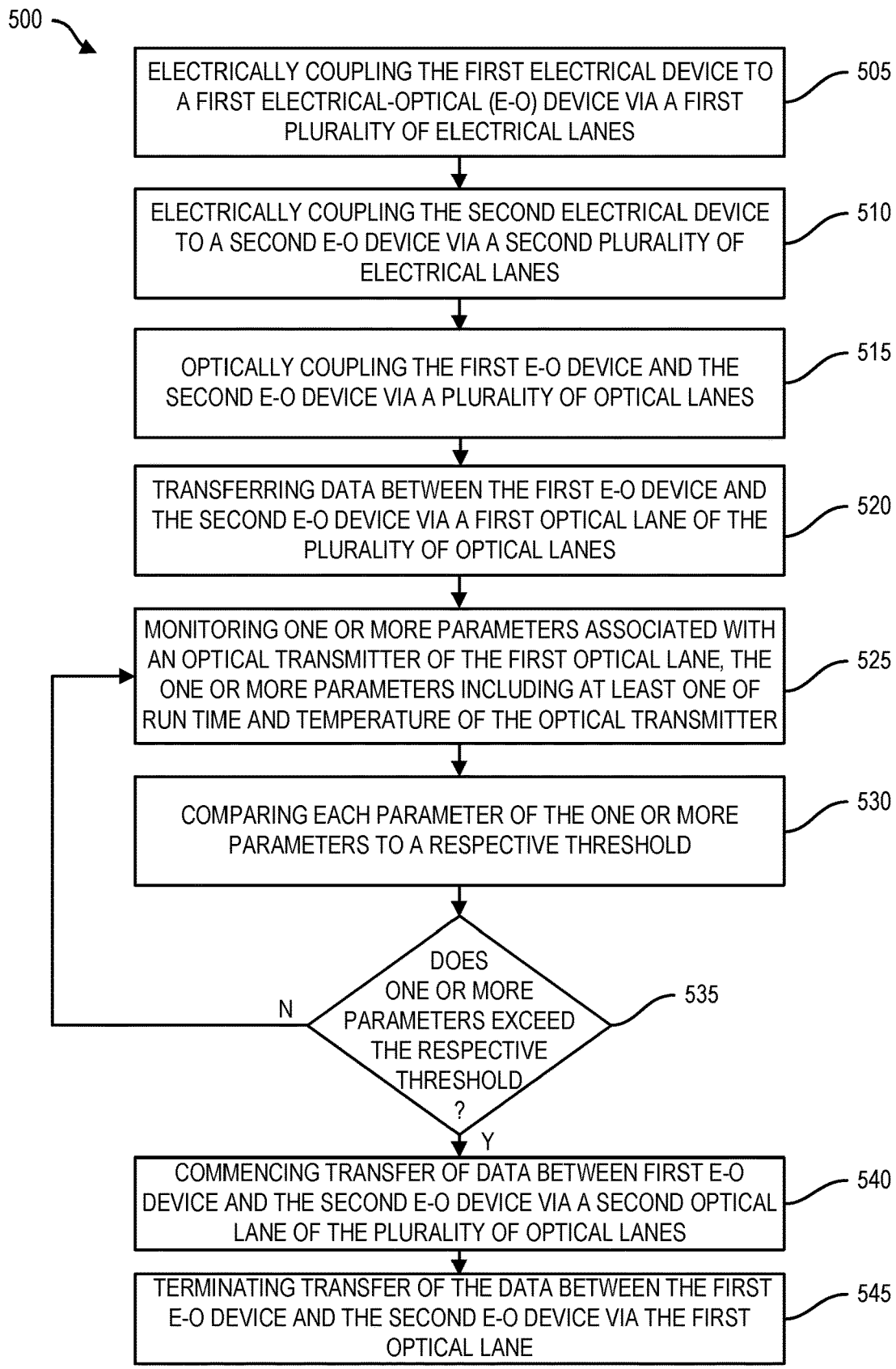
FIG. 5 is a process flow diagram depicting a method for operating a data communication system, according to one or more examples of the disclosure.

Turning now to FIG. 5, FIG. 5 is a process flow diagram depicting an example of logic that may be performed by one or more functional modules to perform data transfer between a first electrical device and a second electrical device (e.g., electrical devices 102-1 and 102-2 discussed above). The logic may be implemented in software, firmware, hardware logic, or a combination thereof and may be used to implement a method 500 as reflected in the process flow diagram of FIG. 5. For example, the link controller 152 may be implemented, in whole or in part, using dedicated hardware, such as the ASIC 136, a plurality of ASICs, complex programmable logic devices (CPLD), and so on. Example method 500 begins at block 505 and includes electrically coupling the first electrical device to a first electrical-optical (E-O) device via a first plurality of electrical lanes. The method 500 also includes electrically coupling (block 510) the second electrical device to a second E-O device via a second plurality of electrical lanes.

The method 500 further includes optically coupling (block 515) the first E-O device and the second E-O device via a plurality of optical lanes. The plurality of optical lanes may be greater in number than each of the first plurality of electrical lanes and the second plurality of electrical lanes. Each optical lane may have a transmission pathway and a reception pathway. Each transmission pathway and each reception pathway may have an optical transmitter and an optical receiver.

The method 500 also includes transferring (block 520) data between the first E-O device and the second E-O device via a first optical lane of the plurality of optical lanes, and monitoring (block 525) one or more parameters associated with an optical transmitter of the first optical lane. The one or more parameters may include at least one of run time and temperature of the optical transmitter. The method 500 further includes comparing (block 530) each parameter of the one or more parameters to a respective threshold.

At block 535, the method 500 includes determining if one parameter of the one or more parameters exceeds the respective threshold. If the one parameter of the one or more parameters does not exceed the respective threshold, the method 500 returns to block 525. In response to the one parameter of the one or more parameters exceeding the respective threshold, method 500 includes commencing (block 535) transfer of data between first E-O device and the second E-O device via a second optical lane of the plurality of optical lanes, and terminating (block 540) transfer of the data between the first E-O device and the second E-O device via the first optical lane.

Figure 6:
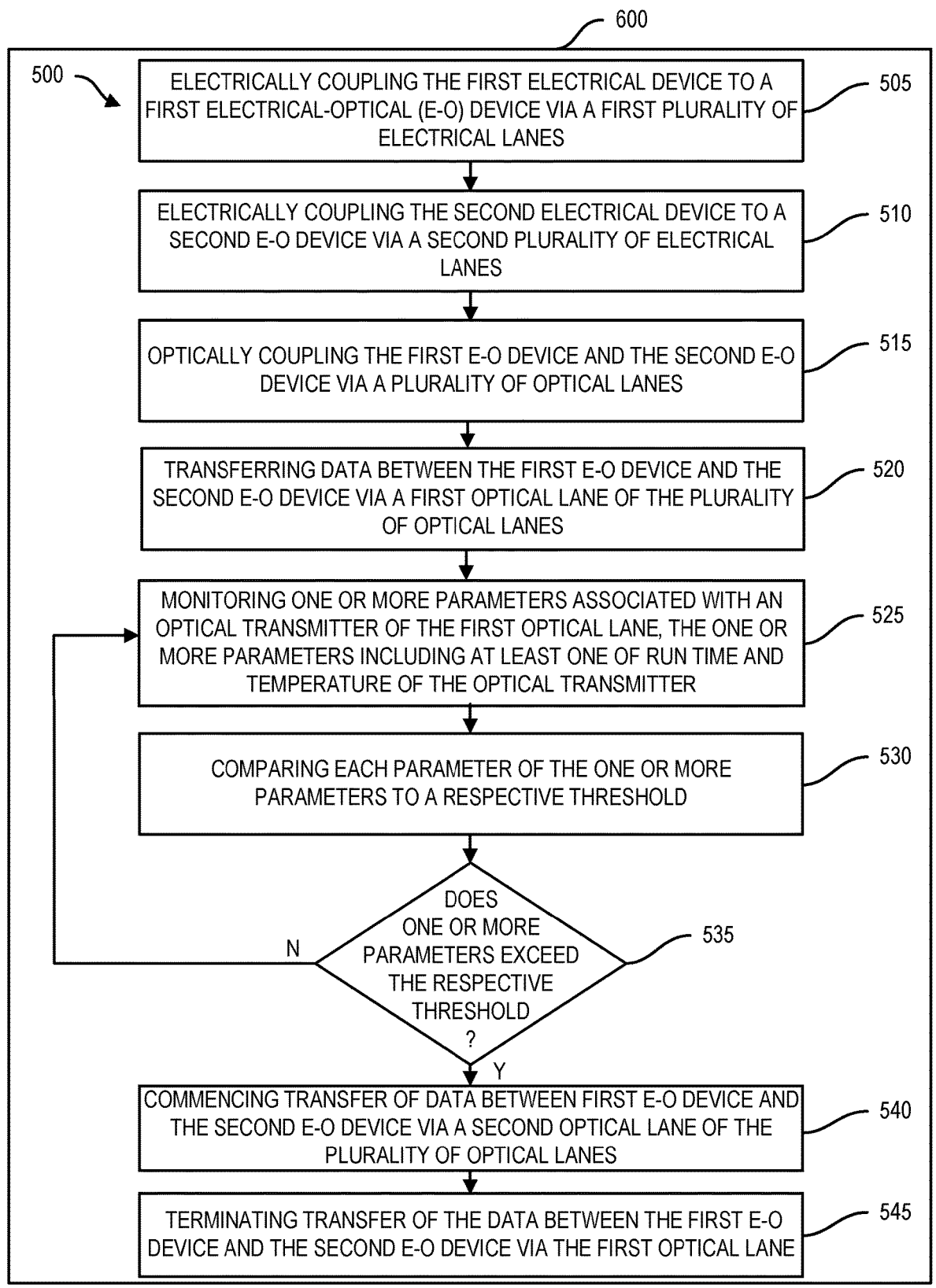
FIG. 6 is a computing device programmed with logic that may be used to perform a method for transferring data between a first electrical device and a second electrical device, according to one or more examples of the disclosure.

Referring now to FIG. 6, FIG. 6 depicts a computing device 600 programmed with logic (505-545) for performing data transfer between a first electrical device and a second electrical device, according to one or more examples of the disclosure. The computing device 600 may be or may include a processing resource. The processing resource may be a programmable logic device, such as ASIC 136, programmed with logic (505-545) causing the computing device 600 to perform a number of operations consistent with the flowchart of FIG. 5. Because the operations of FIG. 5 have already been described in detail, such operations need not be repeated for the sake of brevity.

Although the example illustrated in FIGS. 1-6 disclose components of the E-O devices 104, including the link controller 152, implemented, in whole or in part, using dedicated hardware, such as application-specific integrated circuits (ASICs), the link controller 152 and other components of the E-O interface device may be implemented with one or more processors and memory including a non-transitory computer-readable medium. In such implementations, the non-transitory computer-readable medium may store instructions that, when executed by the processor(s), cause the processor(s) to perform the method of FIG. 5. Moreover, the instructions may be configured to cause the processor to perform any of the operations of the methods disclosed herein. The non-transitory computer-readable storage medium may be integrated in the link controller 152, or the non-transitory computer-readable storage medium may be separate from but accessible to the link controller 152.

In one example, the stored instructions may be part of an installation package that when installed may be executed by the processor(s) to implement any of the operations of the methods disclosed herein. In this case, the non-transitory computer-readable storage medium may be a portable medium such as an optical disk (e,g., compact disc (CD) or digital video disc (DVD)), or flash drive or a memory maintained by a server from which the installation package can be downloaded or installed. In another example, the stored instructions may be part of an application or applications already installed. Here, the non-transitory computer-readable storage medium may include integrated memory such as hard drive, solid state drive, and the like.

As used herein, a "processor" may include any circuitry that is capable of executing machine-readable instructions, such as central processing units (CPUs), microprocessors, microcontrollers, digital signal processors (DSPs), field-programmable gate arrays (FPGAs), application-specific instruction set processors (ASIPs), etc.

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and BLU-RAY® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g , a floppy disk or a hard drive) or optical (e.g., a CD ROM), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Still further, the examples discussed above and illustrated in the drawings pertain to just two of the many potential parameters—namely, temperature and/or run-time of the optical transmitter. As mentioned, there are other parameters that can be used. The discussion above also mentions transmitter output power, receiver input power, and link margin measured at the receiver. However, these parameters are examples and the list of parameters set forth herein is neither exhaustive nor exclusive. Those in the art having the benefit of this disclosure may appreciate still other parameters that might be used in other examples.

Similarly, the examples set forth herein involve parameters in which the comparison of the parameter to the threshold determines whether the value of the parameter exceeds the respective threshold. However, other examples monitoring the parameters described herein or other parameters may compare those parameters to determine whether they fall below—rather than exceed—their respective threshold. Whether the comparison is for exceeding or falling below the respective threshold will depend on the parameter in a manner that will be apparent to those skilled in the art having the benefit of this disclosure.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for performing data transfer between a first electrical device and a second electrical device, comprising:
   electrically coupling the first electrical device to a first electrical-optical (E-O) device via a first plurality of electrical lanes;
   electrically coupling the second electrical device to a second E-O device via a second plurality of electrical lanes;
   optically coupling the first E-O device and the second E-O device via a plurality of optical lanes, the plurality of optical lanes being greater in number than each of the first plurality of electrical lanes and the second plurality of electrical lanes, each optical lane having a transmission pathway and a reception pathway, and each transmission pathway and each reception pathway having an optical transmitter and an optical receiver;
   transferring data between the first E-O device and the second E-O device via a first optical lane of the plurality of optical lanes;
   monitoring one or more parameters associated with an optical transmitter of the first optical lane;
   comparing each parameter of the one or more parameters to a respective threshold; and
   in response to the comparison of at least one parameter of the one or more parameters to the respective threshold, commencing transfer of data between first E-O device and the second E-O device via a second optical lane of the plurality of optical lanes, and
   terminating transfer of the data between the first E-O device and the second E-O device via the first optical lane; wherein:
   the one or more parameters includes the run time of the optical transmitter; and
   the respective threshold is a threshold run time determined by a counter integrated in a controller communicatively coupled with the optical transmitter.

2. The method of claim 1, wherein the one or more parameters include at least one of a run time, a temperature of the optical transmitter, a transmitter output power, a receiver input power, and a link margin measured at the receiver.

3. The method of claim 1, wherein the comparison shows the at least one parameter to exceed the respective threshold.

4. The method of claim 1, wherein the comparison shows the at least one parameter to fall below the respective threshold.

5. The method of claim 1, wherein terminating transfer of the data between the first E-O device and the second E-O device via the first optical lane includes deactivating the optical transmitter of the first optical lane.

6. The method of claim 1, wherein commencing transfer of data between first E-O device and the second E-O device via a second optical lane of the plurality of optical lanes includes activating the second optical transmitter of the second optical lane.

7. The method of claim 1, wherein a ratio of the optical lanes to the electrical lanes of the first plurality of electrical lanes is 3:2.

8. The method of claim 1, wherein:
the one or more parameters includes the temperature of the optical transmitter; and
the respective threshold is a threshold temperature indicative of a temperature at which a power output of the optical transmitter is reduced.

9. The method of claim 1, wherein the optical transmitter of at least one reception pathway is a vertical cavity surface emitting laser.

10. The method of claim 1, wherein the optical transmitter of at least one transmission pathway is a vertical cavity surface emitting laser.

11. The method of claim 1, further comprising:
monitoring one or more parameters associated with the optical transmitter of the second optical lane, the one or more parameters including at least one of run time and temperature of the optical transmitter;
comparing each parameter of the one or more parameters to a respective threshold; and
in response to the comparison of the one parameter of the one or more parameters to the respective threshold,
commencing transfer of data between first E-O device and the second E-O device via the first optical lane or a third optical lane of the plurality of optical lanes, and
terminating transfer of the data between the first E-O device and the second E-O device via the second optical lane.

12. A data communication system comprising:
a first electrical device;
a second electrical device;
a first electrical-optical (E-O) device coupled to the first electrical device via a first plurality of electrical lanes;
a second E-O device coupled to the second electrical device via a second plurality of electrical lanes, the second E-O device further coupled to the first E-O device via a plurality of optical lanes, the plurality of optical lanes being greater in number than each of the first plurality of electrical lanes and the second plurality of electrical lanes, each optical lane having a transmission pathway and a reception pathway, and each transmission pathway and each reception pathway having an optical transmitter and an optical receiver;
a processing resource to:
transfer data between the first E-O device and the second E-O device via a first optical lane of the plurality of optical lanes;
monitor one or more parameters associated with an optical transmitter of the first optical lane, the one or more parameters including at least one of run time and temperature of the optical transmitter;
compare each parameter of the one or more parameters to a respective threshold;
in response to the comparison of at least one parameter of the one or more parameters to the respective threshold,
commence transfer of data between first E-O device and the second E-O device via a second optical lane of the plurality of optical lanes, and
terminate transfer of the data between the first E-O device and the second E-O device via the first optical lane; and
a counter communicatively coupled to the processing resource to determine a run time for each optical transmitter, wherein the processing resource is to;
sum the run time for each optical transmitter; and
store the sum run time for each optical transmitter in the memory.

13. The data transfer system of claim 12, wherein the instructions that, when executed by the processing resource over the bus system, further cause the processing resource to:
monitor one or more parameters associated with the optical transmitter of the second optical lane, the one or more parameters including at least one of run time and temperature of the optical transmitter;
compare each parameter of the one or more parameters to a respective threshold; and
in response to the comparison of at least one parameter of the one or more parameters to the respective threshold,
commence transfer of data between first E-O device and the second E-O device via the first optical lane or a third optical lane of the plurality of optical lanes, and
terminate transfer of the data between the first E-O device and the second E-O device via the second optical lane.

14. The data transfer system of claim 13, wherein:
the one or more parameters of the optical transmitter includes the temperature of the optical transmitter;
the respective threshold is a threshold temperature indicative of a temperature at which a power output of the optical transmitter is reduced; and
the instructions that, when executed by the processing resource over the bus system, further cause the processing resource to:
in response to the comparison of the at least one parameter of the one or more parameters associated with the optical transmitter of the second optical lane to the respective threshold,
determine whether the temperature of the optical transmitter is below the threshold temperature thereof,
commence transfer of data between first E-O device and the second E-O device via the first optical lane when the temperature of the optical transmitter is below the threshold temperature thereof, and
commence transfer of data between first E-O device and the second E-O device via the third optical lane when the temperature of the optical transmitter is above the threshold temperature thereof.

15. The data transfer system of claim 12, further comprising a plurality of sensors, each sensor thermally coupled to a respective optical transmitter to detect a temperature of the respective optical transmitter, and each sensor further being communicatively coupled to the processing resource to provide the processing resource with the temperature of the respective optical transmitter.

16. The data transfer system of claim 12, wherein a ratio of the optical lanes to the electrical lanes of the first plurality of electrical lanes is 3:2.

17. The data transfer system of claim 12, wherein each optical transmitter is a vertical cavity surface emitting laser.

18. A processing resource, the processing resource programmed to perform the logic of:
  transferring data between a first E-O device and a second E-O device via a first optical lane of a plurality of optical lanes coupling the first E-O device and the second E-O device, wherein
    the first electrical-optical (E-O) interface device is coupled to a first electrical device via a first plurality of electrical lanes,
    the second E-O device is coupled to a second electrical device via a second plurality of electrical lanes,
    the plurality of optical lanes is greater in number than each of the first plurality of electrical lanes and the second plurality of electrical lanes,
    each optical lane has a transmission pathway and a reception pathway, and
    each transmission pathway and each reception pathway has an optical transmitter and an optical receiver;
  monitoring one or more parameters associated with an optical transmitter of the first optical lane, the one or more parameters including at least one of run time and temperature of the optical transmitter;
  comparing each parameter of the one or more parameters to a respective threshold; and
  in response to the comparison of at least one parameter of the one or more parameters to the respective threshold,
    commencing transfer of data between first E-O device and the second E-O device via a second optical lane of the plurality of optical lanes, and
    terminating transfer of the data between the first E-O device and the second E-O device via the first optical lane;

wherein:
  the one or more parameters includes the run time of the optical transmitter; and
  the respective threshold is a threshold run time determined by a counter integrated in a controller communicatively coupled with the optical transmitter.

19. The processing resource of claim 18, wherein:
  the one or more parameters includes the temperature of the optical transmitter; and
  the respective threshold is a threshold temperature indicative of a temperature at which a power output of the optical transmitter is reduced.

20. The processing resource of claim 18, wherein the processing resource is further programmed to perform the logic of:
  monitoring one or more parameters associated with the optical transmitter of the second optical lane, the one or more parameters including at least one of run time and temperature of the optical transmitter;
  comparing each parameter of the one or more parameters to a respective threshold; and
  in response to the comparison of at least one parameter of the one or more parameters to the respective threshold,
    commence transfer of data between first E-O device and the second E-O device via the first optical lane or a third optical lane of the plurality of optical lanes, and
    terminate transfer of the data between the first E-O device and the second E-O device via the second optical lane.

* * * * *